United States Patent [19]

Wohlers et al.

[11] 3,958,246

[45] May 18, 1976

[54] CIRCULAR RETRODIRECTIVE ARRAY

[75] Inventors: Robert J. Wohlers, Orchard Park; Stephen N. Andre, Eden, both of N.Y.

[73] Assignee: Calspan Corporation, Buffalo, N.Y.

[22] Filed: July 5, 1974

[21] Appl. No.: 485,864

[52] U.S. Cl. .......................... 343/754; 343/100 TD; 343/854
[51] Int. Cl.² ..................... H01Q 3/26; H01Q 19/06
[58] Field of Search ........... 343/753, 754, 755, 909, 343/100 TD, 854

[56] References Cited
UNITED STATES PATENTS

| | | | |
|---|---|---|---|
| 2,576,182 | 11/1951 | Wilkinson | 343/754 |
| 2,580,921 | 1/1952 | Jams | 343/911 R |
| 3,307,196 | 2/1967 | Horst | 343/911 R |
| 3,392,394 | 7/1968 | Caballero | 343/754 |

*Primary Examiner*—Eli Lieberman
*Attorney, Agent, or Firm*—Allen J. Jaffe

[57] ABSTRACT

The retrodirective array antenna of the present invention employs a circular, focusing parallel plate lens to interconnect array elements, thus producing a body with an inherently large radar cross section. By modulating the radiated signal from such an array, it is possible to meet the requirements for passive beacon and data transmission applications. Information transmittal is accomplished via the selection of the modulation function.

9 Claims, 7 Drawing Figures

CIRCULAR RETRODIRECTIVE ARRAY

One of the difficulties associated with air traffic control lies with aircraft identification. Large commercial aircraft utilize an active transponder to perform the identification function, but the cost of such items is prohibitive for use by light, private planes. One potential solution to the problem lies in the use of modulated retrodirective reflectors wherein the radar signal reflected can be coded to contain required information.

Since aircraft can present a variable aspect angle to the viewing radar, the retrodirective reflector must operate in a full 360° azimuth plane, a mode of operation that is impossible to achieve with either standard Luneberg reflectors or corner reflectors. The coverage required can be achieved with a Van Atta array such as is taught by Lewis in U.S. Pat. No. 3,496,570. However, the cost and volume of such an array can become prohibitive when the interconnections between the elements are considered. This is because each transmission line connecting pairs of monopoles in a Van Atta array must be of equal length and this soon results in a "rat's nest" of wire as the number of pairs of monopoles increases.

It is an object of this invention to provide a retrodirective array antenna which is low in cost and affords ease of modulation.

It is a further object of this invention to provide a retrodirective array antenna which is adapted to be incorporated into the skin structure forming the outside of an aircraft, missile, motor vehicle or marine craft.

It is an additional object of this invention to provide a retrodirective array which can be mounted flush with the outside skin of an aircraft, missile, motor vehicle, marine vehicle, marine craft or any other structure.

It is a still further object of this invention to provide a radar reflector which can be used with most conventional radar systems such as radar navigation, ground mapping radar, collision warning radar, early warning radar, for the purposes of radar cross section augmentation, passive identification, and passive electronic counter-measures. These objects, and others as will become apparent hereinafter, are accomplished by the present invention.

Basically, the present invention eliminates the need for interconnections between elements such as characterize a Van Atta array. The interconnections are eliminated by the use of a non-homogeneous Maxwell fisheye lens or by an equivalent fisheye lens. The present invention offers certain advantages such as size, weight, cost and angular coverage over conventional retrodirective reflector antenna systems.

BRIEF DESCRIPTION OF THE DRAWINGS

For a fuller understanding of the present invention, reference should now be had to the following detailed description thereof taken in conjunction with the accompanying drawings wherein.

DESCRIPTION OF THE PREFERRED EMBODIMENTS

Figure 1:
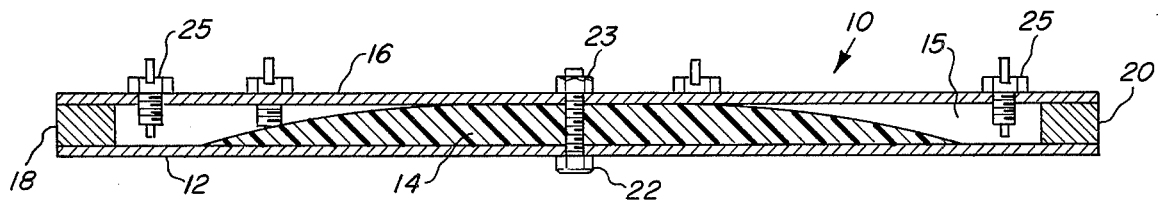
FIG. 1 is a sectional view of a retrodirective array antenna assembly employing an equivalent Maxwell fisheye lens.
Figure 3:
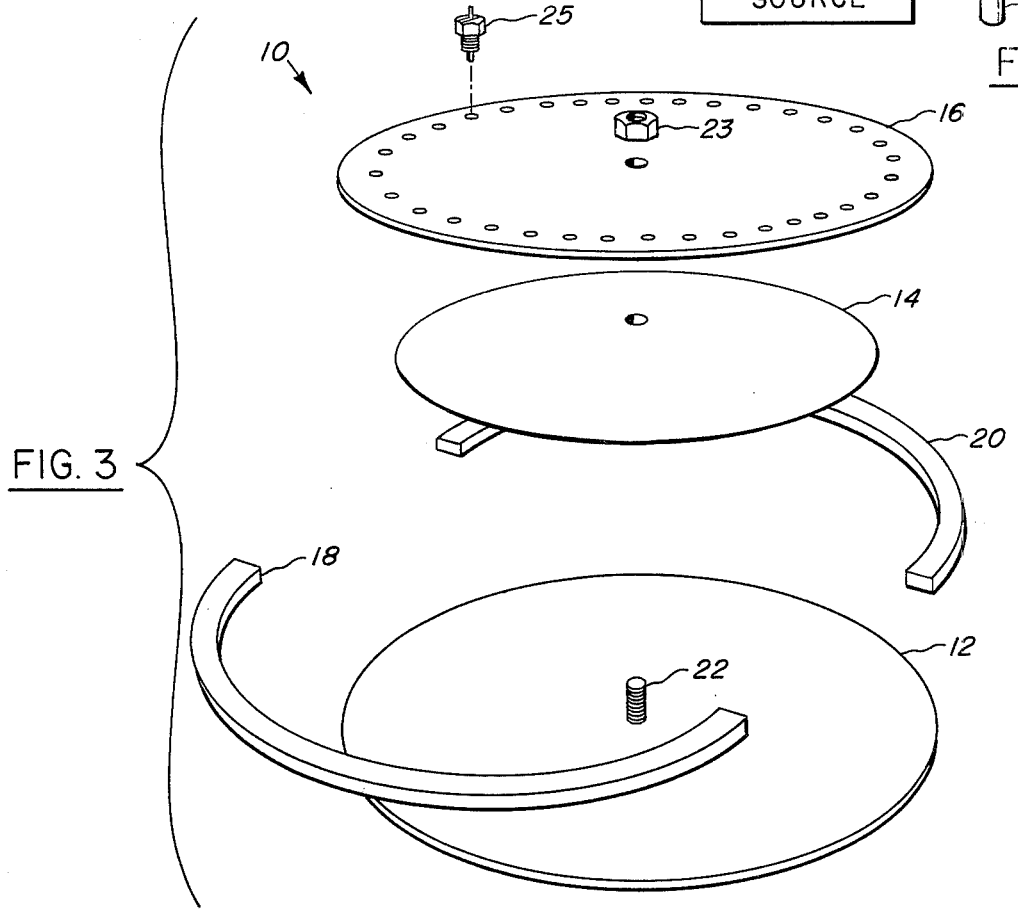
FIG. 3 is an exploded view of the retrodirective array antenna assembly of FIG. 1.

In FIGS. 1 and 3 the numeral 10 generally designates a retrodirective array antenna assembly which includes a base plate 12 and a cover plate 16 with a lens 14 located therebetween. Spacer members 18 and 20 provide a proper spacing of plates 12 and 16 at this peripheries. The antenna assembly 10 is held in its assembled position by centrally located bolt 22 and nut 23. A plurality of pairs of monopoles 25 are located circumferentially around and radially outward of the lens 14. to that of the center of the lens 14 would be 1:4 due to the effect of the amount of air in the lens chamber 15 at the rim of lens 14 and would vary at intermediate points. The equivalent Maxwell fisheye lens 14 would have the property of focusing a source located on its periphery into a focal point diametrically opposite the source. This eliminates the need for interconnections between monopoles 25 and results in an inexpensive retrodirective array with 360°coverage. A probe fed parallel plate waveguide capable of propagating only the transverse electromagnetic mode would be used with lens 14.

A suitable antenna assembly can be constructed using an equivalent Maxwell fisheye lens made of Fiberglas having a dielectric constant of 4 and which is 10 inches in diameter and with a maximum thickness of ¼ inch. Such a lens could be located in an assembly approximately 13¼ in diameter and ¼ inch high and would readily accommodate 60 monopoles, +pairs, spaced at 6° intervals on the circumference of a circle 11 inches in diameter.

Figure 2:
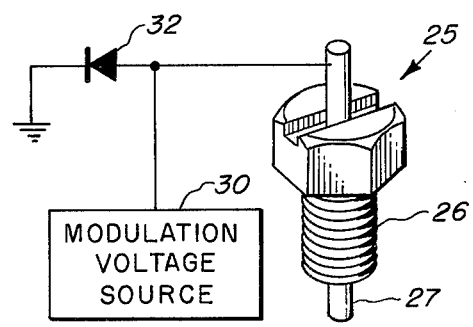
FIG. 2 is a view of one of the monopoles of FIG. 1 showing a connection to achieve modulation of the transmitted signal.

As best shown in FIG. 2, monopoles 25 include a plastic screw 26 having a coupling probe 27 extending through both ends of plastic screw 26. The portion of coupling probe 27 extending above the heads of screws 26 are used to connect the antenna assembly 10 into the system in which it is to be used. To achieve modulation of the transmitted signal the monopoles 25 of the system may be connected directly to a modulation voltage source 30 and connected to ground via a PIN diode 32 as illustrated. The numbers and patterns of connections of the monopoles 25 to the modulation voltage source 30 and PIN diodes 32 will depend upon the modulation desired.

Figure 4:
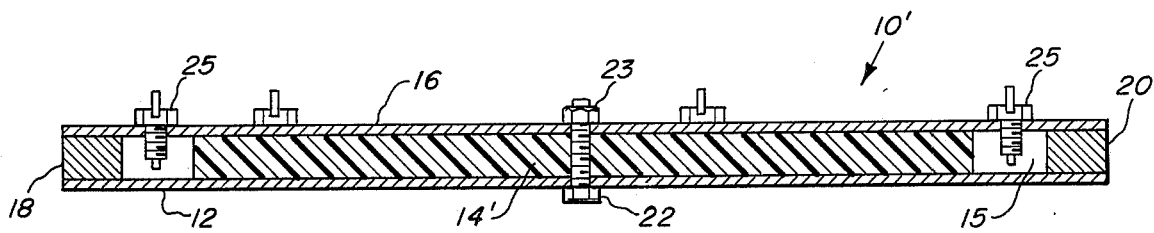
FIG. 4 is a sectional view of a retrodirective array antenna employing a Maxwell fisheye lens.

FIG. 4 illustrates a retrodirective array antenna assembly 10' which is identical to that of FIG. 1 except for the details of lens 14' and like structure has been similarly labeled. Lens 14' is a "true" Maxwell fisheye lens and is made of a non-homogeneous material having a graded or variable dielectric constant. Like lens 14 of FIG. 1, in lens 14' the ratio of the dielectric constant at the rim to that at the center of the lens 14' would be 1:4 and would vary with the radius.

OPERATION

In the operation of the system, a plane wave arrives at the retrodirective array 10. Energy from the incoming wave is absorbed by each of the antenna elements or monopoles 25 and is coupled by probes 27 (see FIG. 2) to the inside of the parallel-plate lens 14. The electrical length of all of the antenna elements 25 and their probes 27 is identical such that the relative phase relationship of the signals at the antenna elements 25 due to the incoming wavefront is preserved through entry of the signals into the parallel-plate lens region. The RF energy is supplied in parallel to the lens 14 from all of the coupling probes 27.

Figure 5:
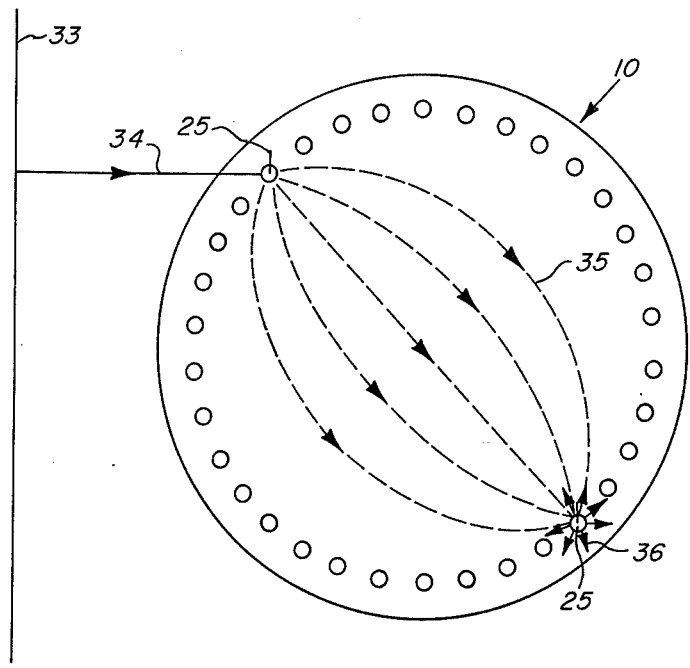
FIG. 5 is a view showing the ray paths through the lens.
Figure 6:
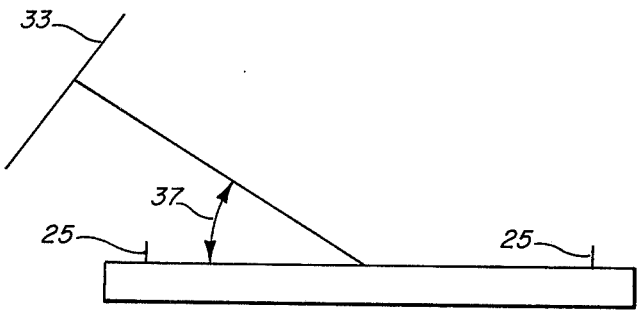
FIG. 6 is a view of the incident plane wavefront at an elevation angle.
Figure 7:
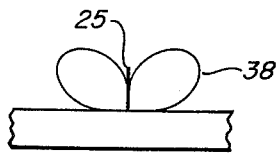
FIG. 7 is a view of the antenna pattern for monopoles.

The action of the lens 14 is to direct the RF energy, received by any one probe to the probe diametrically opposite in the ring. This RF energy is then re-radiated by the antenna element connected to that probe. The action of the lens 14 is further described by the diagram of FIG. 5 which illustrates the ray paths through the lens 14 for one pair of diametrically opposite elements. The plane wavefront 33 arrives at the retrodirective array 10 and the signal received by one of the array elements 25 arrives by ray path 34. Similar parallel ray paths exist for all of the elements. The relative phase of the signals excited in the elements 25 by the incident plane wave 33 is proportional to the length of the ray paths 34 between the reference plane wave 33 and the elements 25. This is the same electrical phase delay as would be predicted for any phased array. It should be noted that the plane wave direction and ray paths need not be in the same plane as the top plate surface of retrodirective array 10 of the array but can be at an arbitrary elevation angle 37 from this plane, as illustrated in FIG. 6, without degrading the retrodirective phasing action of the lens 14. Selection of the type of array element will govern the elevation angular coverage; for example with monopoles, elevation angles from 0 degrees to about 45 degrees are within the coverage sector as shown by the antenna pattern 38 of a monopole as illustrated in FIG. 7. Other type elements, such as dipoles or slots could provide coverage from 45° elevation angle to 90° elevation angle.

It should also be noted that blockage of the array elements 25 on the back side of the array, as viewed from the incoming wavefront direction, by elements on the forward side of the array will not occur. Even at 0 degree elevation angle, electrical blockage will not occur because of diffraction of the electrical fields around the elements on the forward side of the array.

The action of the lens 14 on the fields coupled to the inside of the parallel plate region by one of the array elements 25 is illustrated by the dotted ray paths 35 which show the ray curvature as caused by the lens 14 and focusing on the rays on the element positioned diametrically opposite to the original element. It should be noted that similar ray paths simultaneously exist in the opposite direction to that shown in FIG. 5 and also between all diametrically opposite pairs of elements. The total action of the lens and parallel plate region is to electrically couple all pairs of diametrically opposite pairs of elements in a manner similar to that obtained with coaxial transmission lines between all the pairs of diametrically opposite elements. The single parallel plate and lens assembly is a much simpler means of providing this action.

The signal re-radiated by any one of the elements is accomplished according to the antenna pattern of the element. For monopole elements, the azimuthal pattern is omnidirectional represented by the radial rays 36 shown in FIG. 5. The action of the signals re-radiated by all of the elements acting simultaneously is to form an antenna pattern maximum back in the direction of the incident plane wave, 33 in FIGS. 5 and 6. The retrodirective array action is the same as described by Van Atta, U.S. Pat. No. 2,908,002. The advantage of the approach described herein is the use of a parallel-plate and lens assembly to replace all of the transmission lines required to interconnect the array elements which results in a much simpler, more compact and less costly retrodirective array.

Coupling probe 27 of each of the monopoles 25 will be connected into the assembly in which it is to be used. The focusing parallel plate lenses 14 and 14' interconnect pairs of monopoles 25 which are diametrically located since lenses 14 and 14' have the property of focusing a source located on their periphery into a focal point diametrically opposite the source. Thus the signal from each monopole 25 is coupled to the diametrically opposite monopole 25 through the parallel plates lens action of lenses 14 and 14' to provide the retrodirective capability of the device. Modulation of the transmitted signal can be incorporated into the device by including controllable devices, such as PIN diodes 32, connected to a source of a control signal 30, incorporated into the monopoles 25 or into the lenses 14 or 14'. When using the equivalent fisheye lens 14, each monopole 25 is probe coupled to a parallel plate region whose height is sufficiently small that only the transverse electromagnetic mode can propagate.

The field radiated by each monopole 25 is caused by current induced directly by the incident field and the coupling from the diametrically opposed monopole 25. Thus the radar cross section is a function of the electrical path length within the parallel plate/lens region. The total scattered field and radar cross section are computed from the phasor sum of the fields radiated by all of the monopoles 25. Bistatic radar cross section is typically 10 – 20 dB below monostatic radar cross section.

Although primarily intended as a retrodirective array with a full 360° azimuth coverage and capable of being modulated (each probe feed can be connected to a modulating element as shown in FIG. 2), the device can be used in any application requiring 360° passive radar cross section augmentation. Using monopoles 25 as array elements, the device can handle vertical polarization, while if turnstiles (tri-dipoles) are used the device will be capable of handling horizontal polarization. If every other element is a monopole and interspersed between is a turnstile, both polarizations can be handled simultaneously.

Although a preferred embodiment of the present invention has been illustrated and described, other changes will occur to those skilled in the art. It is therefore intended that the scope of the present invention is to be limited only by the scope of the appended claims.

We claim:

1. A retrodirective array antenna comprising:
   housing means including a base plate and a cover plate which are separated by spacer means to define a substantially cylindrical chamber;
   a plurality of pairs of diametrically located array elements circumferentially located on said cover plate to extend outwardly therefrom and having probe means extending into said chamber; and
   lens means located within said chamber for focusing and directing energy between said elements of said pairs of diametrically located array elements.

2. The antenna of claim 1 wherein said array elements are monopoles.

3. The antenna of claim 1 wherein said lens means is a non-homogeneous Maxwell fisheye lens.

4. The antenna of claim 1 wherein said lens means is an equivalent fisheye lens.

5. The antenna of claim 1 further comprising means for modulating the radar cross section of said antenna.

6. The antenna of claim 5 wherein said means for modulating the radar cross section includes solid state devices whose electrical characteristics can be electronically controlled.

7. The antenna of claim 6 wherein said array elements are monopoles.

8. The antenna of claim 6 wherein said lens means is a non-homogeneous Maxwell fisheye lens.

9. The antenna of claim 6 wherein said lens means is an equivalent fisheye lens.

* * * * *

UNITED STATES PATENT OFFICE
CERTIFICATE OF CORRECTION

PATENT NO. : 3,958,246
DATED : May 18, 1976
INVENTOR(S) : Robert J. Wohlers et al.

It is certified that error appears in the above-identified patent and that said Letters Patent are hereby corrected as shown below:

Column 2, between lines 20 and 21 indent and insert -- Lens 14 is an equivalent Maxwell fisheye lens and is made of a material having a fixed dielectric constant but is of varying thickness. The ratio of the effective dielectric constant at the rim of lens 14 -- ;

line 38 change "$13\frac{1}{4}$" to -- $13\frac{1}{2}$ -- ; line 38 change "$\frac{1}{4}$" to -- $\frac{1}{2}$ -- ;

line 39 change "+" to -- 30 -- .

Signed and Sealed this

Seventh Day of June 1977

[SEAL]

Attest:

RUTH C. MASON
Attesting Officer

C. MARSHALL DANN
Commissioner of Patents and Trademarks